Figure 1:
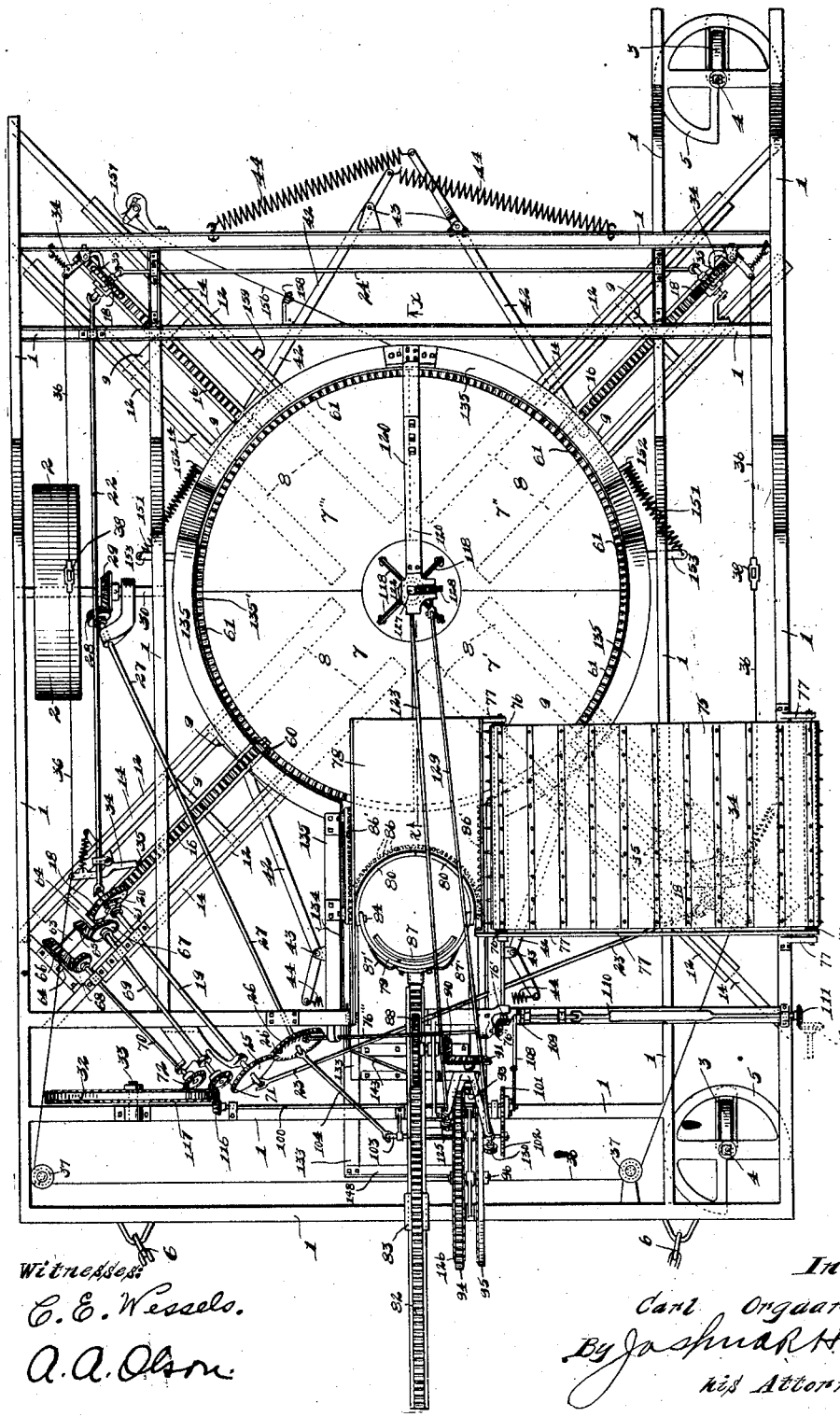

C. ORGAARD.
SHOCKING MACHINE.
APPLICATION FILED JAN. 19, 1912.

1,040,002.

Patented Oct. 1, 1912.
13 SHEETS—SHEET 1.

Witnesses:
C. E. Wessels.
A. A. Olson.

Inventor:
Carl Orgaard,
By Joshua R. H. Potts
his Attorney.

C. ORGAARD.
SHOCKING MACHINE.
APPLICATION FILED JAN. 19, 1912.
1,040,002.
Patented Oct. 1, 1912.
13 SHEETS—SHEET 2.
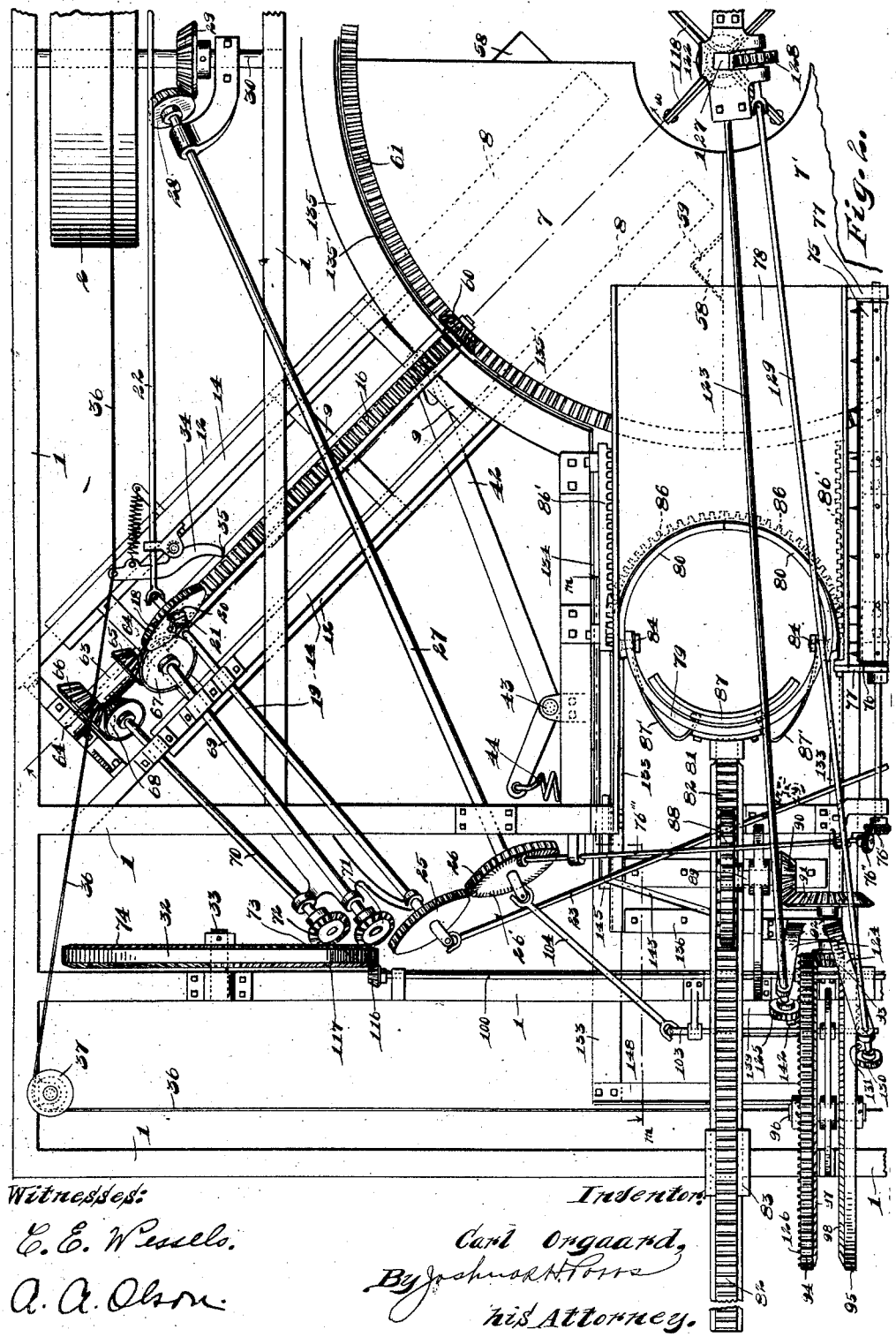
Witnesses:
E. E. Wessels.
A. A. Olson.
Inventor:
Carl Orgaard,
By Joshua H. Potts
his Attorney.

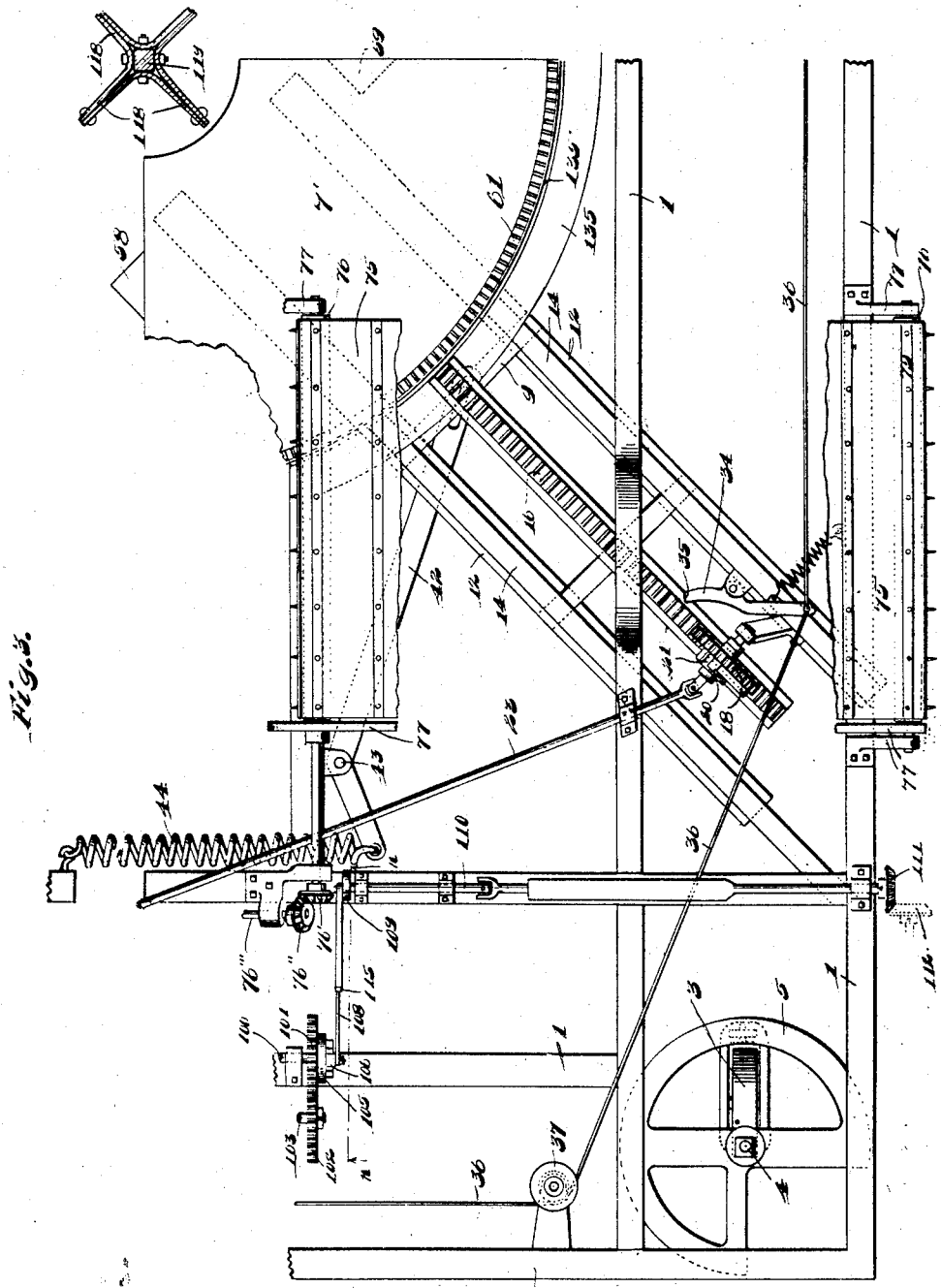

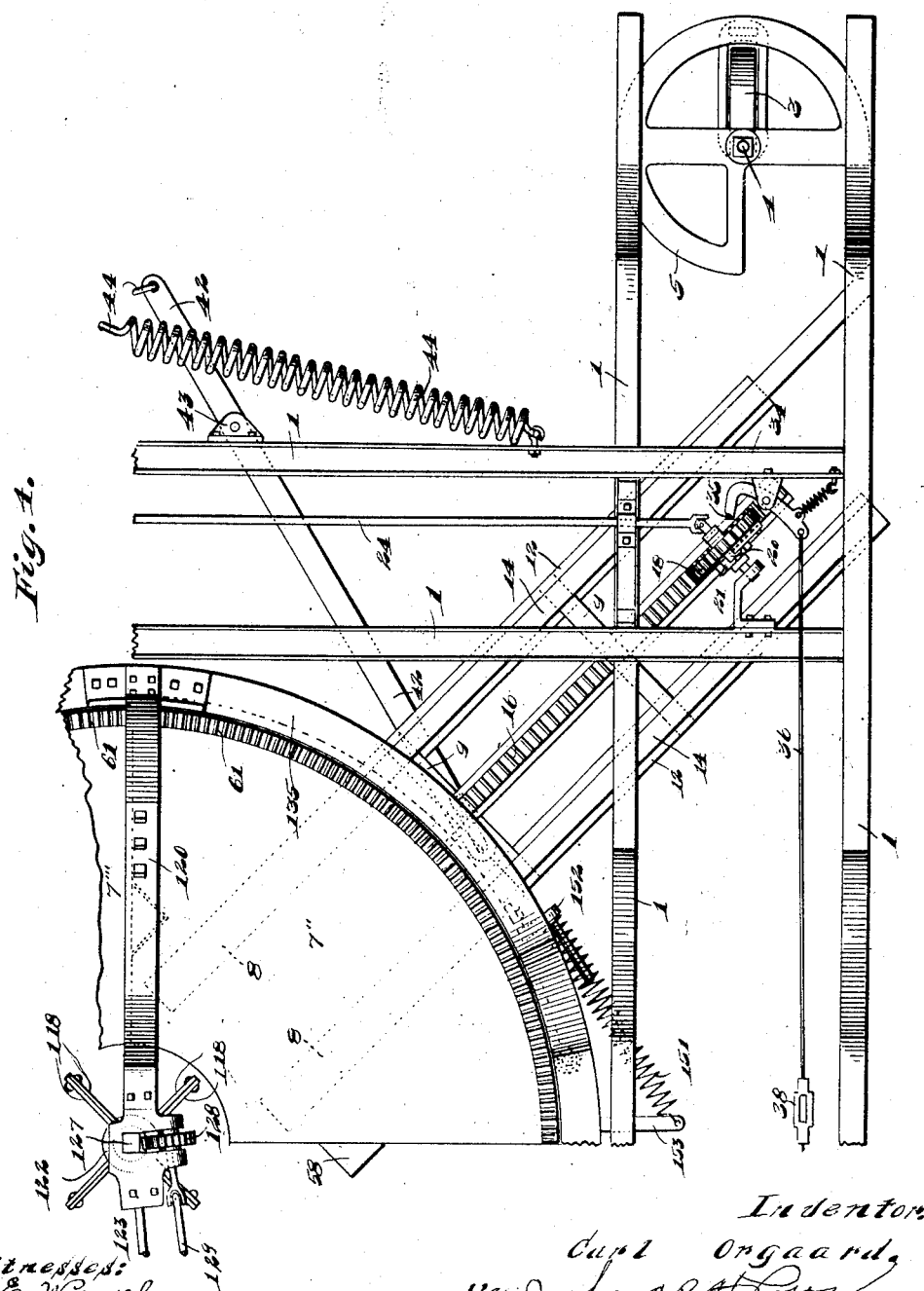

C. ORGAARD.
SHOCKING MACHINE.
APPLICATION FILED JAN. 19, 1912.
1,040,002.
Patented Oct. 1, 1912.
13 SHEETS—SHEET 5.
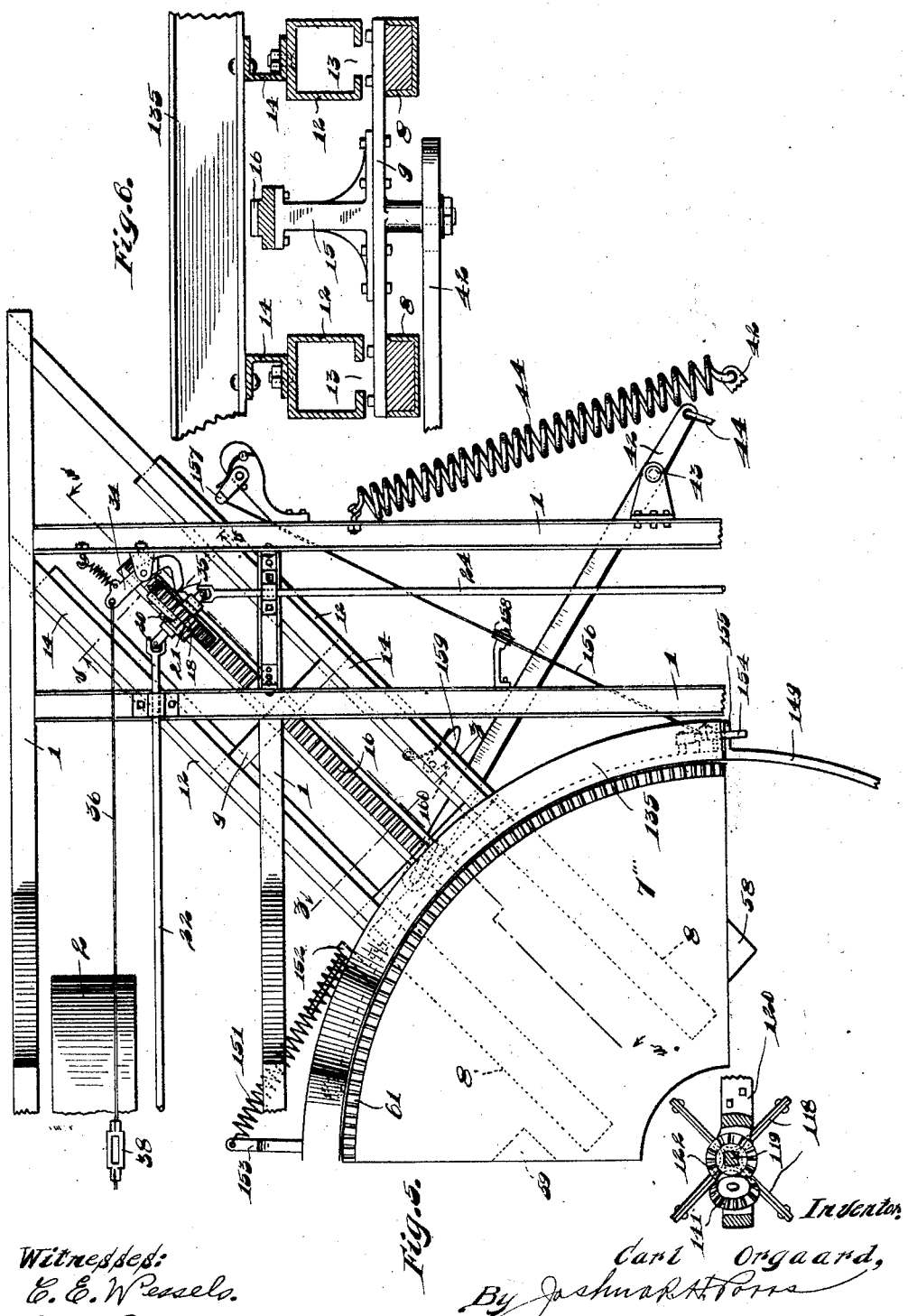

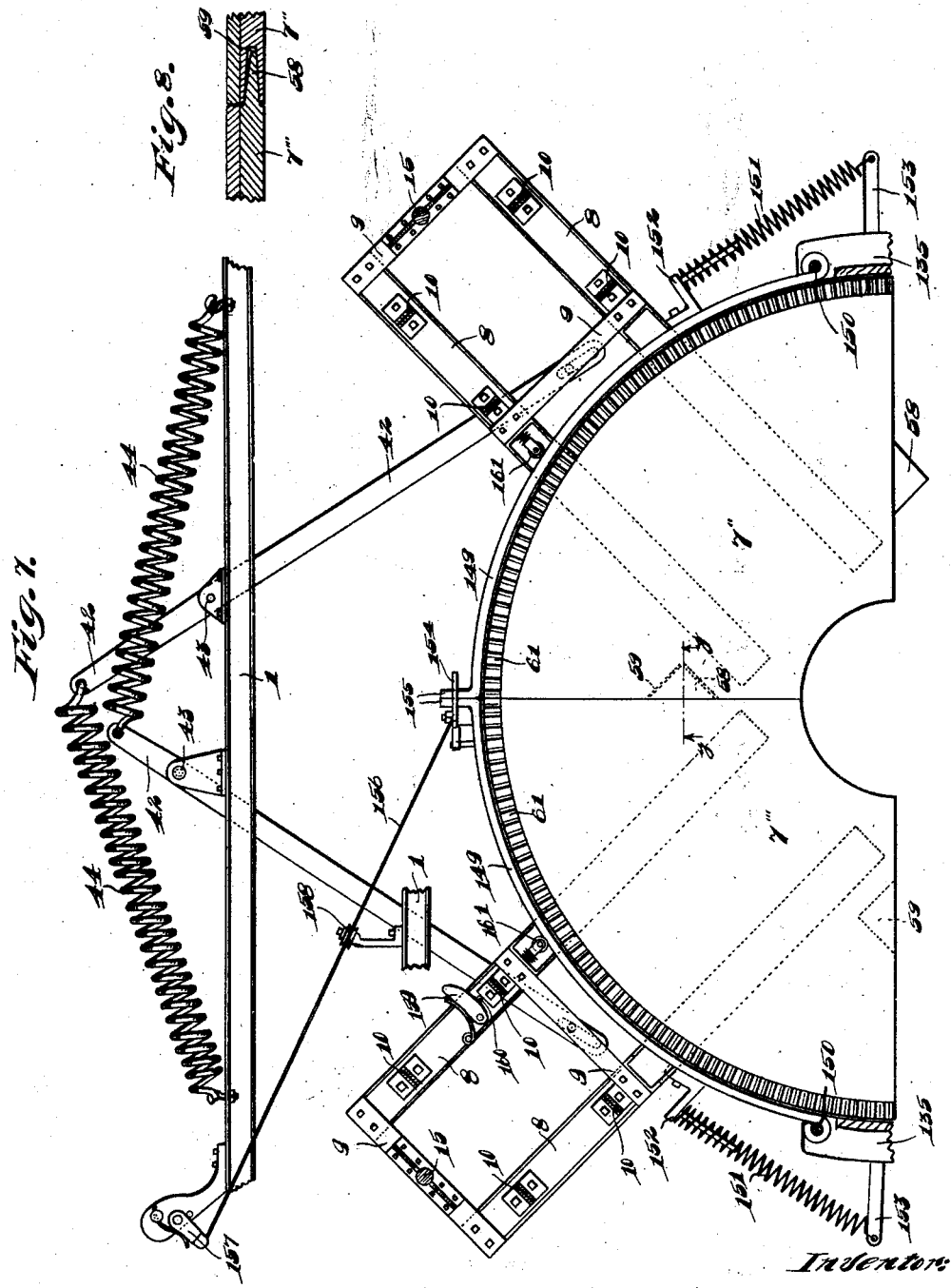

C. ORGAARD.
SHOCKING MACHINE.
APPLICATION FILED JAN. 19, 1912.

1,040,002.

Patented Oct. 1, 1912.
13 SHEETS—SHEET 7.

C. ORGAARD.
SHOCKING MACHINE.
APPLICATION FILED JAN. 19, 1912.
1,040,002.
Patented Oct. 1, 1912.
13 SHEETS—SHEET 8.
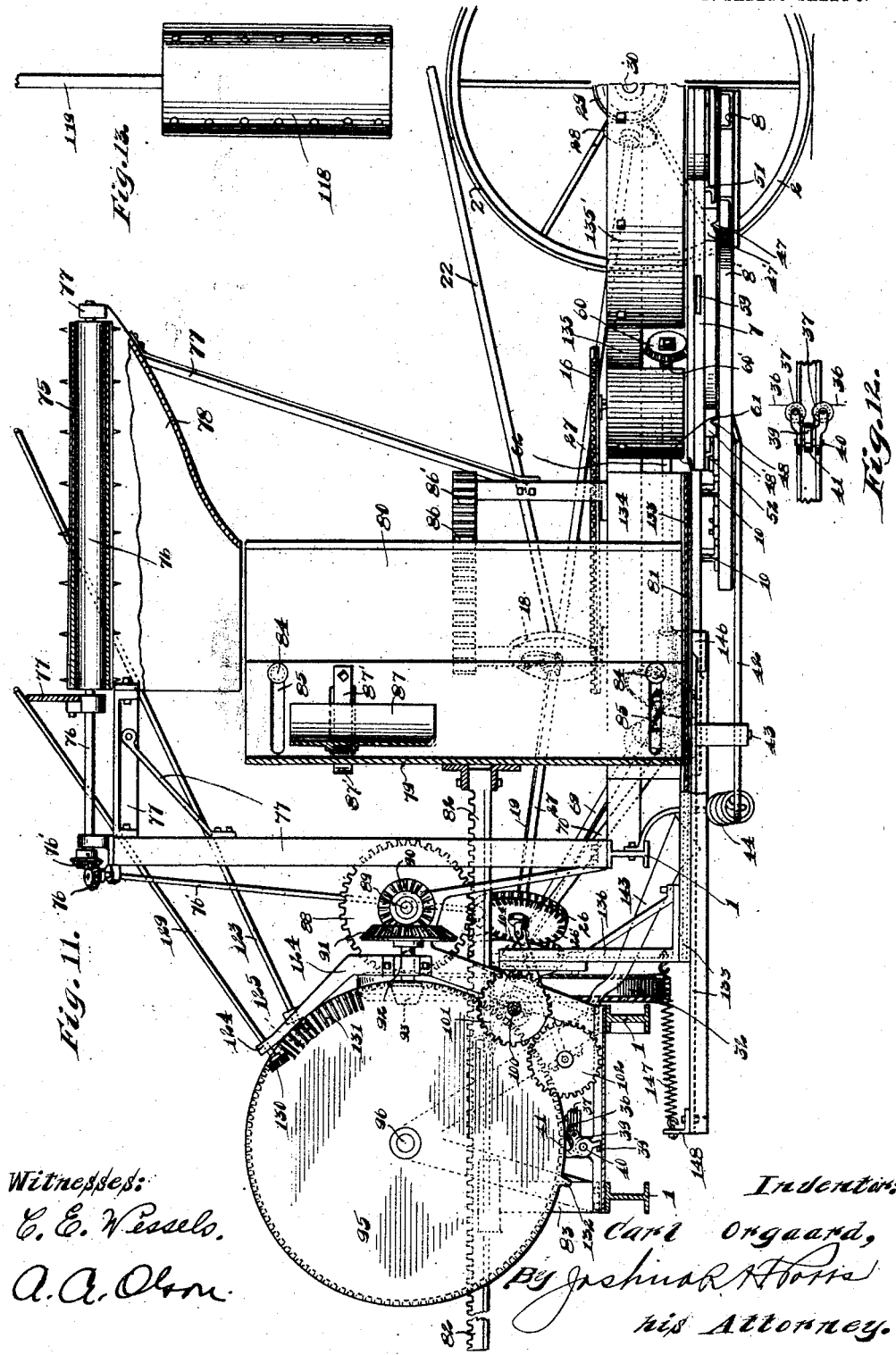
Witnesses:
C. E. Wessels.
A. A. Olson.
Inventor:
Carl Orgaard,
By Joshua R. H. Potts
his Attorney.

C. ORGAARD.
SHOCKING MACHINE.
APPLICATION FILED JAN. 19, 1912.
1,040,002.
Patented Oct. 1, 1912.
13 SHEETS—SHEET 9.
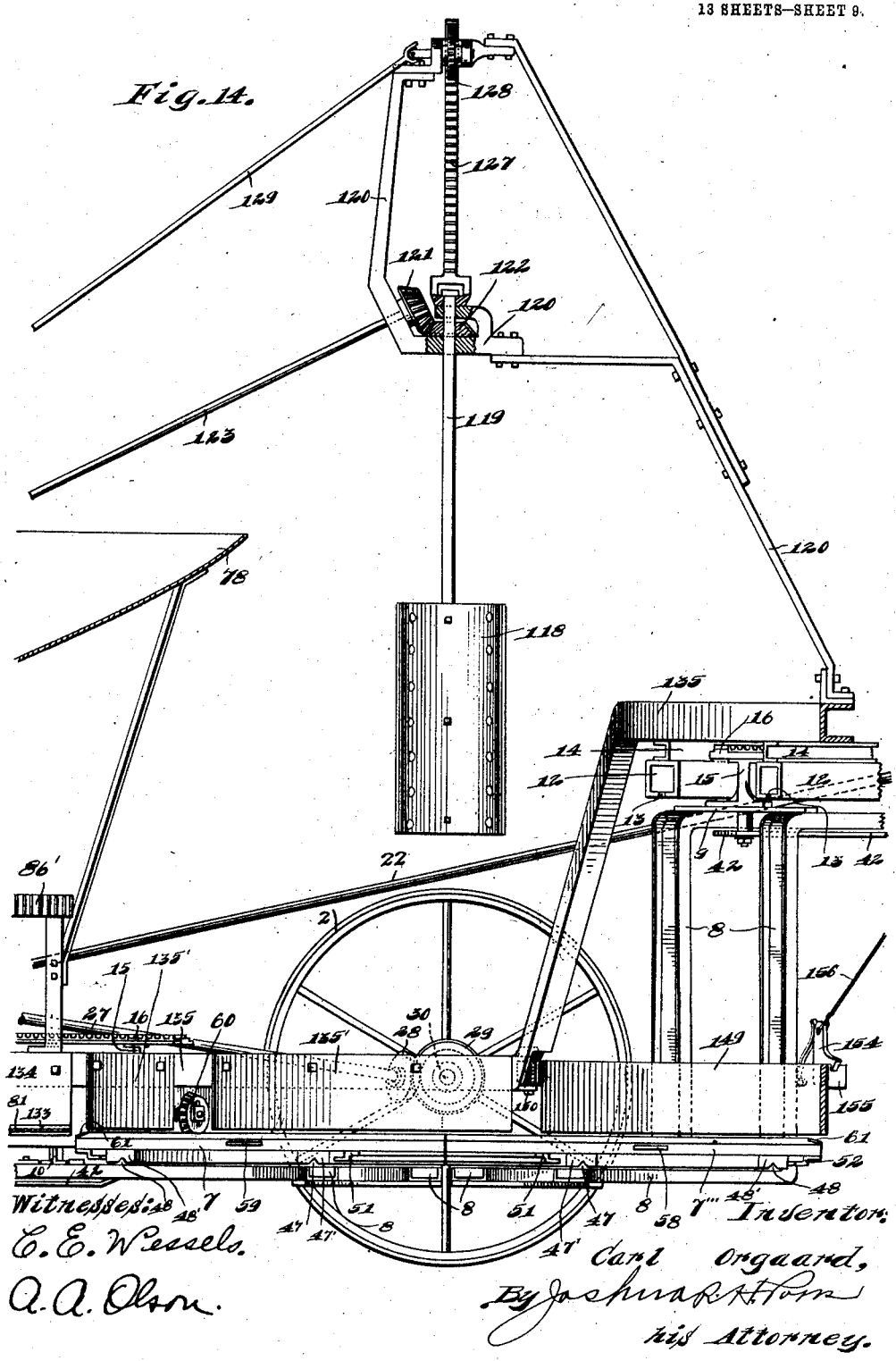

C. ORGAARD.
SHOCKING MACHINE.
APPLICATION FILED JAN. 19, 1912.
1,040,002.
Patented Oct. 1, 1912.
13 SHEETS—SHEET 10.
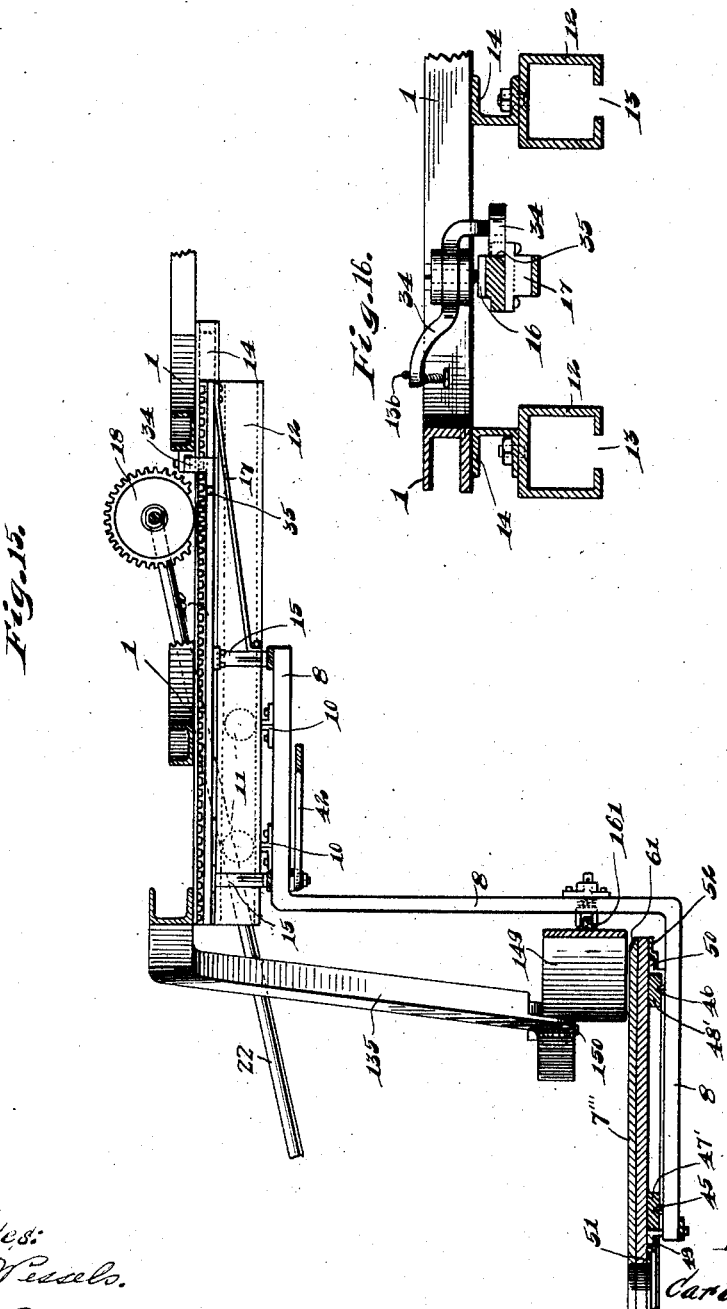
Witnesses:
E. E. Wessels.
A. A. Olson.

C. ORGAARD.
SHOCKING MACHINE.
APPLICATION FILED JAN. 19, 1912.
1,040,002.
Patented Oct. 1, 1912.
13 SHEETS—SHEET 11.
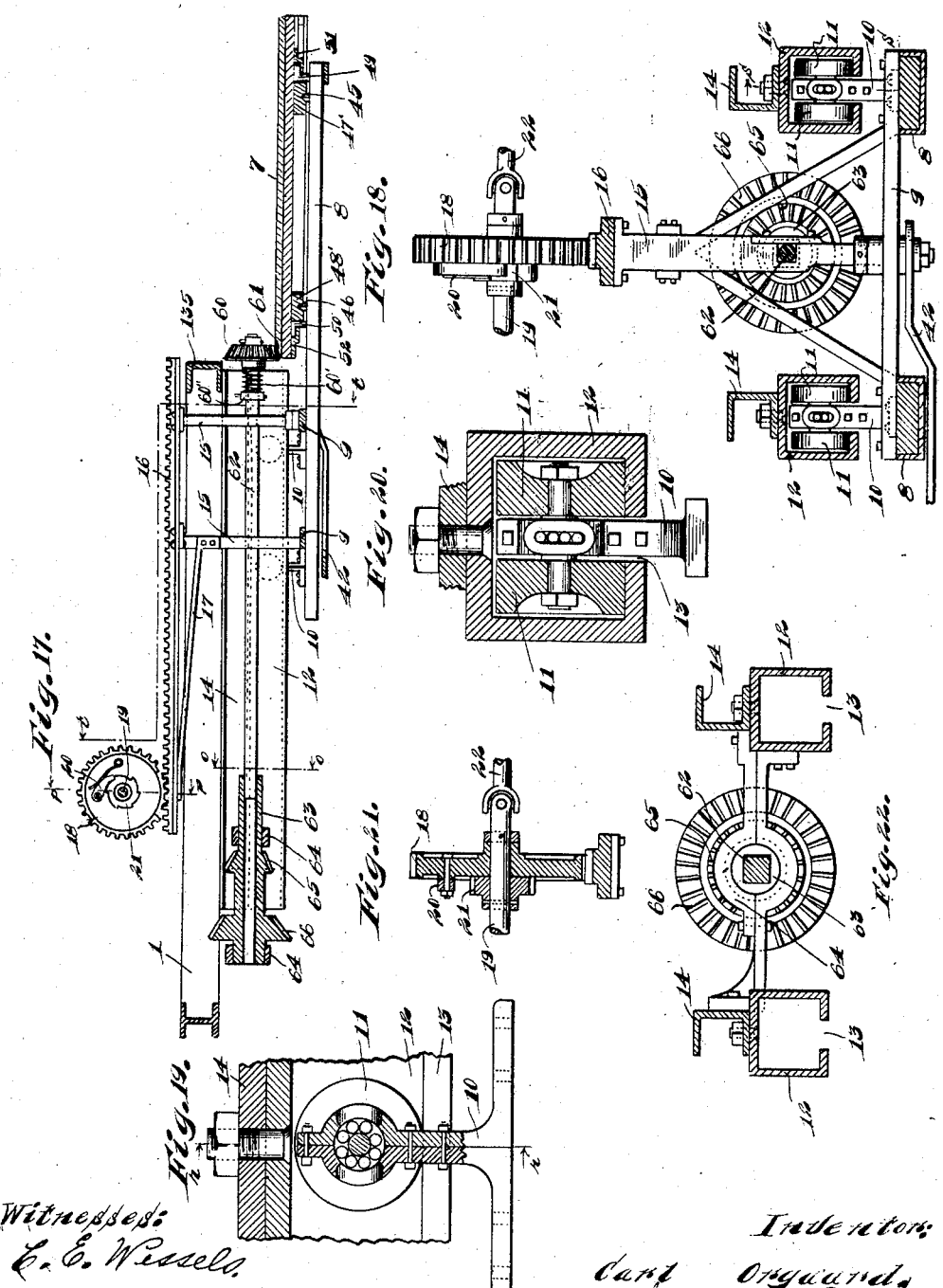

C. ORGAARD.
SHOCKING MACHINE.
APPLICATION FILED JAN. 19, 1912.

1,040,002.

Patented Oct. 1, 1912.
13 SHEETS—SHEET 12.

Witnesses:
E. E. Wissels.
A. A. Olson.

Inventor:
Carl Orgaard,
By Joshua R. H. Potts
his Attorney

C. ORGAARD.
SHOCKING MACHINE.
APPLICATION FILED JAN. 19, 1912.
1,040,002.
Patented Oct. 1, 1912.
13 SHEETS—SHEET 13.
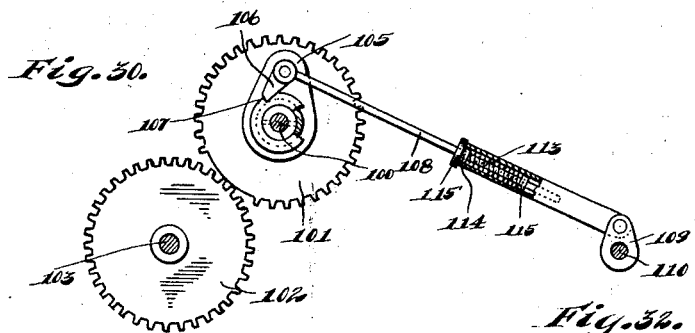
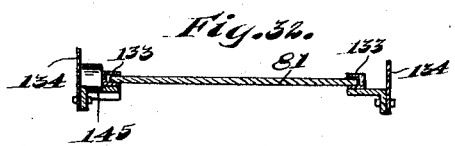
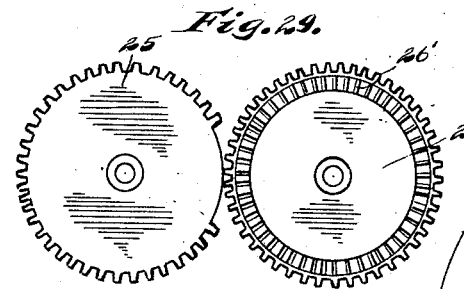
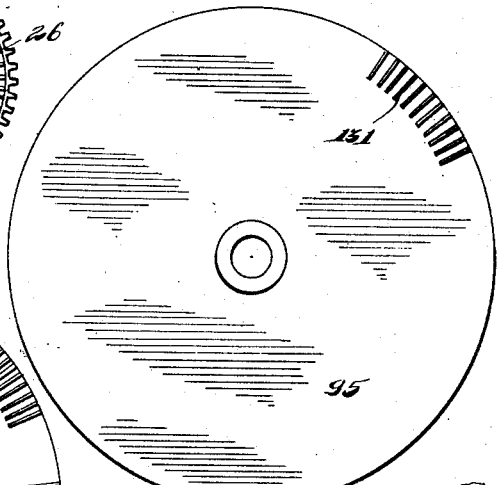
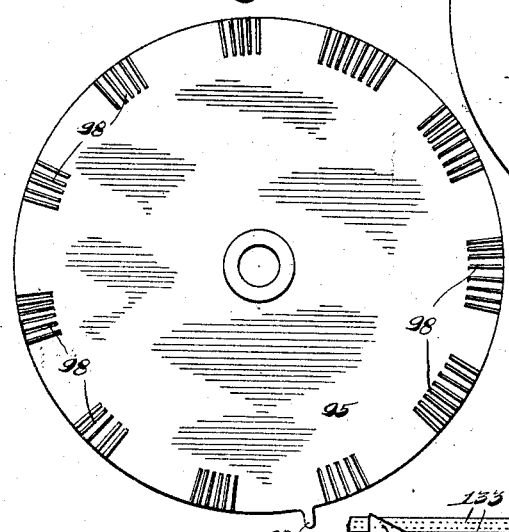
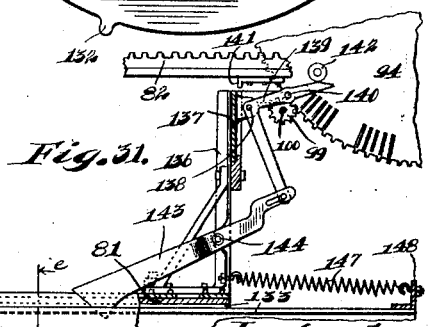
Witnesses:
E. E. Wesselo.
A. A. Olson.
Inventor:
Carl Orgaard,
By Joshua R H Potts
his Attorney.

UNITED STATES PATENT OFFICE.

CARL ORGAARD, OF WHEELOCK, NORTH DAKOTA, ASSIGNOR OF ONE-FIFTH TO ALBERT G. J. ANDERSON, OF TIOGA, NORTH DAKOTA.

SHOCKING-MACHINE.

1,040,002.      Specification of Letters Patent.      Patented Oct. 1, 1912.

Application filed January 19, 1912. Serial No. 672,163.

*To all whom it may concern:*

Be it known that I, CARL ORGAARD, a citizen of the United States, and a resident of the city of Wheelock, county of Williams, and State of North Dakota, have invented certain new and useful Improvements in Shocking-Machines, of which the following is a specification.

My invention relates to devices for shocking bundles or sheaves of grain, and has for its object the production of a device of this character which will be adapted, when in operation, to effect the automatic shocking of the bundles of grain which are delivered thereto by the binding machine or other mechanism in conjunction with which the device is employed.

A further object is the production of a shocking machine which will be of durable and economical construction and efficient in operation.

Other objects will appear hereinafter.

With these objects in view, my invention consists in the combinations and arrangements of parts hereinafter described and claimed.

My invention will be best understood by reference to the accompanying drawings forming a part of this specification, and in which—

Figure 9:
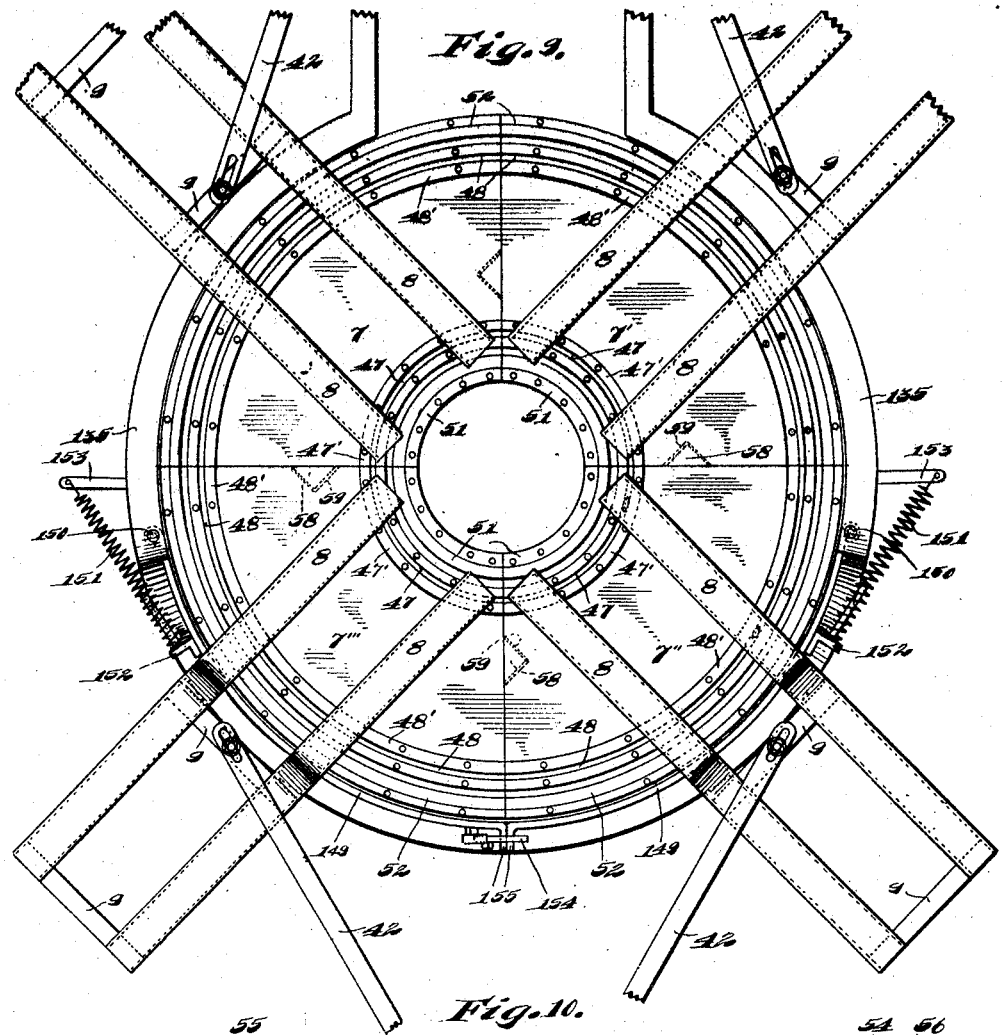
Figure 10:
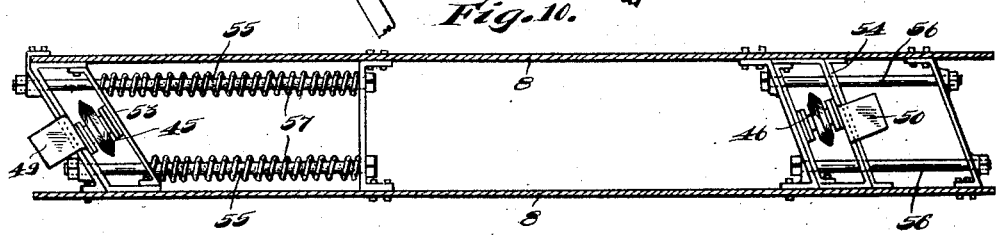
Figure 23:
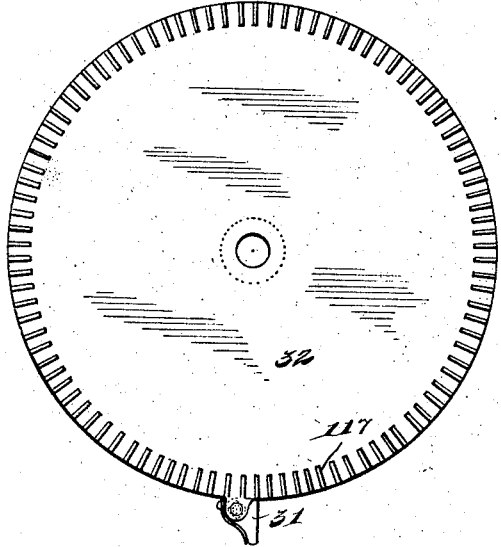
Figure 24:
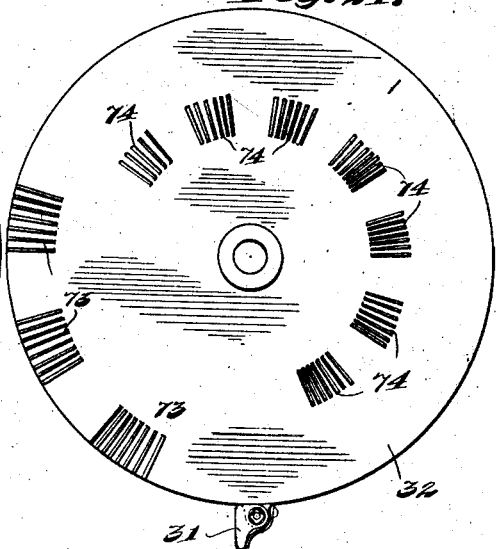
Figure 25:
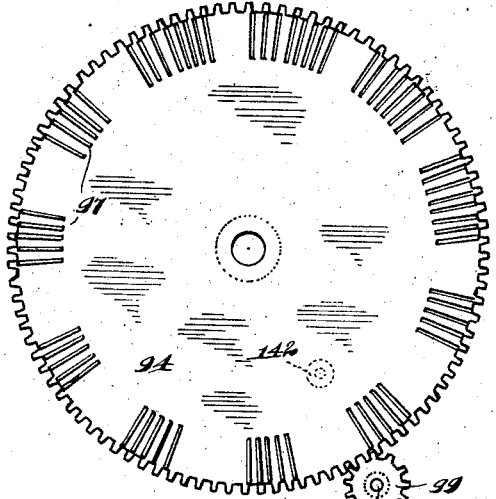
Figure 26:
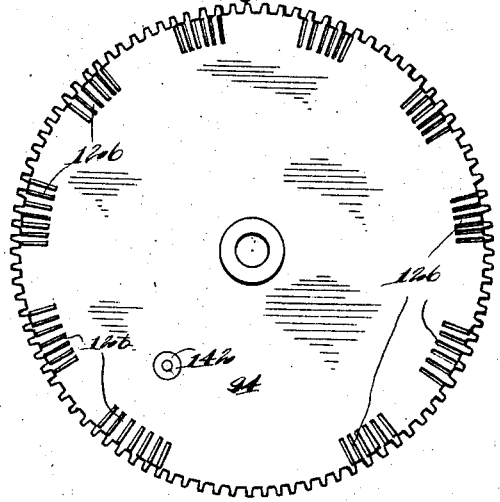

Figure 1 is a top plan view of a shocking machine embodying my invention, Figs. 2, 3, 4 and 5 are enlarged top plan views of the various portions of the mechanism shown in Fig. 1, Fig. 6 is an enlarged detail section taken on substantially line $z\ z$ of Fig. 5, Fig. 7 is a detail top plan view of the rear portion of the machine, portions being shown in section and portions omitted in order to better illustrate the construction, Fig. 8 is an enlarged detail section taken on line $y\ y$ of Fig. 7, Fig. 9 is a detail bottom plan view of the central or platform portion of the machine, Fig. 10 is an enlarged sectional detail of one of the supporting arms of the platform shown in Fig. 9, Fig. 11 is a substantially central vertical longitudinal section of the forward end portion of the machine, Fig. 12 is a detail top plan view of a portion of the construction shown in Fig. 11, Fig. 13 is a detail side elevation of the movable supporting member which is arranged above the platform and against which the grain bundles are supported when arranged upon the platform, Fig. 14 is an enlarged vertical section taken on substantially line $x\ x$ of Fig. 1, Fig. 15 is a detail section taken on substantially line $w\ w$ of Fig. 5, Fig. 16 is an enlarged detail section taken on substantially line $v\ v$ of Fig. 5, Fig. 17 is a detail section taken on substantially line $u\ u$ of Fig. 2, Fig. 18 is an enlarged detail vertical transverse section taken on substantially line $t\ t$ of Fig. 17, Fig. 19 is an enlarged detail section taken on line $s\ s$ of Fig. 18, Fig. 20 is a section taken on line $r\ r$ of Fig. 19, Fig. 21 is a detail section taken on line $p\ p$ of Fig. 17, Fig. 22 is an enlarged detail vertical transverse section taken on substantially line $o\ o$ of Fig. 17, Figs. 23 and 24 are views of the opposite sides of one of the gears included in the construction, Figs. 25 and 26 are views of the opposite sides of another of the gears included in the construction, Figs. 27 and 28 are views of the opposite sides of another gear included in the construction, Fig. 29 is a detail of certain of the gears of the construction, Fig. 30 is a detail section taken on substantially line $n\ n$ of Fig. 3, Fig. 31 is a detail section taken on substantially line $m\ m$ of Fig. 2, and Fig. 32 is a detail transverse section taken on line $l\ l$ of Fig. 31.

The preferred form of construction, as illustrated in the drawings, comprises a supporting frame 1 which is preferably formed of channel iron, the same being of irregular construction in order to adapt the same to support the various constructions and mechanisms which are comprised in the machine. The frame 1 is supported upon the traction wheel 2 and the caster wheels 3, the latter being pivotally secured at 4 in circular guard frames 5. At the front end of the frame 1 are provided chains or other connecting or draft elements 6, through the medium of which the device may be connected with any suitable means for effecting the drawing thereof over the ground.

Arranged substantially centrally in the frame 1 is a circular platform composed of a plurality of sections or segments, preferably four in number and designated as 7, 7', 7'' and 7'''. Each of the platform sections is supported in horizontal position and coplanar with the remaining sections by means of a pair of horizontally disposed supporting members 8, the members 8 being formed preferably of channel irons. The members 8 supporting the rear platform sections, that is the sections 7″ and 7‴, are bent upwardly or offset intermediate their extremities, as clearly shown in Figs. 1, 14 and 15, in order to afford clearance for the grain bundles when discharged from the platform onto the ground in the manner hereinafter set forth.

The members 8 coöperating with each of the platform sections are disposed parallel with each other and the same are connected at their outer ends by transversely extending bars or strips 9. Arising from the members 8 are brackets 10 at the upper ends of which are mounted rollers 11, as clearly shown in figures from 17 to 20 inclusive. The shafts of the rollers 11 are preferably mounted in ball bearings, as clearly shown in the several figures, said rollers being mounted within channel members 12, the latter being provided with longitudinal slots 13 at their under sides to permit of the passage of the brackets 10. The members 12 are rigidly connected through the medium of channel members 14 with the adjacent frame bars 1. The platform sections are thus slidably supported in the channel bars 12 in such a manner as to permit of radial horizontal movement of said platform sections and so that said sections may be moved together or in close proximity with each other, as clearly shown in Fig. 1, to form a continuous platform, or the same may be moved outwardly from each other in radial lines so as to effect the discharge of bundles of grain which may be arranged thereon, in the manner hereinafter set forth.

Arising from the connecting bars 9 of the pairs of supporting members 8 of the platform sections, as clearly shown in Figs. 17 and 18, are brackets 15 at the upper ends of corresponding ones of which are supported rack bars 16, said rack bars being thus positioned centrally above the pairs of members 8, 12 and 14 and parallel therewith, as clearly shown in Fig. 1. Reinforcing bars 17 are employed to support the outer ends of said rack bars. Coöperating with the rack bars 16 are gears 18, the gear 18 corresponding with the platform section 7 being loosely mounted upon a shaft 19. Operative connection between said gear 18 and the shaft 19 is effected by means of a spring pressed pawl 20 which is secured to one side of said gear and which is adapted to coöperate with a ratchet wheel 21 secured to said shaft, as clearly shown in Fig. 17. By thus securing said gear upon said shaft, adjustment of the former upon the latter is afforded in order to regulate the timing of the throw or inward movement of the rack bar 16 coöperating therewith, as will be readily understood. The pawl and ratchet are so arranged as to receive inward movement of the rack bar 16 by rotation of the shaft 19, outward movement of said rack bar and hence of the platform section connected therewith being secured in a manner hereinafter described. The gear 18 coöperating with the rack bar 16 corresponding with the platform section 7‴, is connected with the shaft 19 by means of a shaft 22, universal or knuckle joints being employed, as shown, in this connection. Likewise, the gear 18 corresponding with the platform section 7′, is connected with the opposite end of the shaft 19 by means of the shaft 23, the gear 18 corresponding with the platform section 7″, being operatively connected with the gear 18 corresponding with the platform section 7‴ through the medium of shaft 24. Thus it will be seen that all of the gears 18 are operatively connected so that rotation of one will effect simultaneous rotation of the others, the gears 18 corresponding with the platform sections 7′, 7″ and 7‴, being adjustably mounted upon their respective shafts in the same manner as the gear 18 corresponding with the section 7, as above described. Operation of the gears 18 to effect the inward movement of the platform sections is secured through the medium of gears 25 and 26, the former being secured to the shaft 19, and the latter to a shaft 27 which is mounted in the frame 1 and which is operatively connected through the medium of a pinion 28 with a gear 29 which is secured to the traction shaft 30 carrying the traction wheel 2. The gear 26 is thus connected in such a manner that the same will be continuously operated during the movement of the machine upon the ground, the same being, as will be observed, positively connected with the traction wheel which necessarily must be rotated during the movement of the device. During the operation of the machine, however, the platform sections are intermittently reciprocated, the same being moved inwardly by the gears 18 to operative position and permitted to remain in this position for a considerable period, during which period, the grain bundles are deposited thereon. The gear 25 must, therefore, be disconnected from the gear 26 after the platform sections have reached their operative positions, and to this end said gear 25 is mutilated, as clearly shown in Fig. 29. Said gear 25 is mutilated at such a point that in the operation of the machine the disconnection of the gear 25 from the gear 26 will occur at the moment the platform sections have arrived at their inner terminals of movement. Said platform sections are held in this position by mechanism described in the following and after being released and moved outwardly, as hereinafter described, will again be returned to operative position through the medium of a pivoted tooth 31 which is carried upon the periphery of a gear 32 mounted adjacent the gear 25, as shown in Fig. 1, said gear being shown in detail in Figs. 23 and 24. The tooth 31 serves to engage the gear 25 so as to move the latter until the teeth thereof engage with the teeth of gear 26 or such a distance as to span the mutilated portion of said gear 25, as will be readily understood. Such limited movement of the gear 25 by the tooth 31 is all that is required since, upon the teeth of said gear 25 being again engaged with the teeth of the continuously rotating gear 26, the latter will impart rotation to said gear 25 to effect the inward movement of the platform sections in the manner before described. The gear 32 is mounted upon a stud shaft 33 suitably mounted in the frame 1 and the same is operatively connected in the manner hereinafter described, so that the same will be turned through one complete rotation in the time which is required for the complete reciprocatory movement of the platform sections.

The platform sections are held at their inner terminals of movement through the medium of pivoted spring held detents 34 which are adapted to engage recesses or notches 35 provided in the flanged bases of the rack bars 16, as clearly shown in the several figures. Said detents are adapted to automatically engage the recesses 35 when the platform sections are in operative position, outward movement of said platform sections not being permitted until said sections are released by said detents. Said detents are operatively connected with each other by a cord 36 which passes around guide rollers 37 provided at intervals in the frame 1, turn buckles 38 being preferably interposed in said cord to afford adjustment of the length of said cord. The arrangement is such that by properly pulling said cord the several detents are simultaneously operated so as to simultaneously release the platform sections. This pulling of the cord 36 is effected by a pivoted member 39 which is pivotally secured at 40, as clearly shown in Figs. 11 and 12. The cord 36 is connected with one arm of said member 39 so that when the arm 41 thereof is engaged and tilted in the manner hereinafter set forth, said cord will be pulled in the proper manner to effect the tilting of the detents 34 to releasing position. A stop 39' coöperates with said member 39 to limit the swinging movement thereof in one direction, as will be readily understood.

Outward movement of the platform sections when released, as just described, is secured by the employment of levers 42 which are fulcrumed intermediate their extremities at 43. Corresponding extremities of said levers 42 are in slot-and-pin connection with the innermost of the bars 9 operatively connected with the various platform sections, as clearly shown in Figs. 3, 4, 5, 7, 9 and 18. Coöperating with the opposite ends of said levers are helical tension springs 44 which, when the platform sections are at their inner positions, are in a condition of tension, and so that, when said sections are released, said springs will act upon said levers so as to tilt the same and effect the instant carrying of the platform sections outwardly. However, in order to permit of this free outward movement of the platform sections, the gears 18 are mutilated, as clearly shown in Fig. 17, the mutilated portions of said gears being in registration with the rack bar 16 coöperating therewith, when the latter and hence the platform sections, are at their inner terminals of movement.

Each of the platform sections, as clearly shown in Figs. 9 and 10, are mounted upon rollers 45 and 46 which are carried in the upper sides of the supporting arms 8, said rollers 45 and 46 engaging grooves 47 and 48 respectively, provided in arcual plates 47' and 48' which are secured upon the under sides of the platform sections adjacent the inner and outer edges thereof. The grooves 47 and 48 of the several platform sections register with each other, as shown, so that rotation of the platform will be permitted, the rollers of the respective pairs of arms 8 successively engaging with the grooves of the various platform sections during such rotation of the platform, as will be readily understood. Projecting angular fingers 49 and 50 are also provided which engage over angular arcual plates 51 and 52 respectively, which are secured upon the under sides of the platform sections adjacent the plates 47' and 48', as clearly shown in Figs. 9, 10 and 17, said fingers 49 and 50 serving to prevent upward movement of the platform sections, maintaining the position thereof in engagement with the supporting rollers 45 and 46, as will be readily understood. Each roller 45 and the corresponding finger 49 and each roller 46 and the corresponding finger 50 are secured in carriers 53 and 54 respectively, which are slidably mounted upon bars 55 and 56 secured in each of the arms 8, as clearly shown in Fig. 10. Each carrier 53 is yieldingly held in normal position by means of helical compression springs 57, the carriers 54 being freely movable upon the bars 56. This construction lends yieldability to the connection of the platform sections with the various supporting arms 8 and so that during the operation of the machine, when said platform sections are moved inwardly with considerable rapidity, the same will yield slightly when contacting one another to avoid any breakage which might otherwise result were the connections rigid and unyielding. The platform sections are maintained coplanar, when at their inner terminals of movement, by means of tapering fingers 58 which project from corresponding contacting edges of said sections, said fingers being adapted to engage registering recesses 59 which are provided in the adjacent edges of contiguous sections, as clearly shown in Figs. 7 and 8.

Rotation of the platform, as above mentioned, is effected by a bevel pinion 60 which meshes with a bevel gear 61 formed at the periphery of said platform at the upper side thereof. The pinion 60 is carried at the inner end of the shaft 62 which is rotatably mounted in bearings provided in the brackets 15 corresponding with the platform section 7, as clearly shown in Figs. 17 and 18. The pinion 60 is slidably mounted upon the shaft 62 but rotatably fixed thereto, a helical compression spring 60' interposed between said pinion and a stationary collar 60'' serving to normally hold said pinion in normal position at the inner extremity of said shaft. This construction is adopted for the same reason as prompted the adoption of the slidable mounting of the rollers 45 and 46, above mentioned, namely to lend yieldability to the construction so as to prevent breakage during the sliding movement of the platform sections. The outer end of the shaft 62 is squared for slidable engagement with the sleeve 63 which is mounted in bearings 64, as shown in Figs. 17 and 22. The sleeve 63 is held stationary, that is against longitudinal movement, hence the reason for adopting the sliding connection between said sleeve and the shaft 62 which, during the operation of the machine, is moved to correspond with the platform section corresponding therewith.

Formed upon the sleeve 63 are bevel gears 65 and 66. The gears 65 and 66 mesh with bevel gears 67 and 68 respectively, carried by shafts 69 and 70, which are suitably mounted in the frame 1, as shown in Figs. 1 and 2. Carried at opposite ends of the shafts 69 and 70 are bevel gears 71 and 72, adapted to mesh with gear teeth 73 and 74 respectively, formed upon the adjacent side of the gear 32, as clearly shown in Fig. 24. The gear 32, then, is the medium through which rotary movement of the platform is secured. During the operation of the machine, it is desired to intermittently move the platform through a total of one and three-quarters revolutions during each complete single revolution of the gear 32. More particularly, it is desired to first move the platform intermittently through three successive partial rotations each 90 degrees in extent or amplitude; and then intermittently to move said platform through seven partial rotations each of an extent or amplitude corresponding with one-seventh of a complete rotation. To this end, three divisions of gear teeth 73 have been provided for engagement with the gear 71 whereby, upon rotation of the gear 32, the divisions of gear teeth 73 will successively and intermittently engage said gear 71 to intermittently rotate the platform through three-quarters of a revolution, as above mentioned; and seven divisions of gear teeth 74 have been provided for engagement with the gear 32 whereby, upon rotation of said gear 32, after the last division of the teeth 73 is moved out of engagement with the pinion 71, said gear teeth divisions 74 will successively engage the gear 72 to effect the intermittent movement of the platform through an entire revolution, as above mentioned. The teeth 73 and 74 are so arranged that when gear 71 is in engagement with the former, the gear 72 will be positioned out of engagement with the latter and vice versa.

Arranged at one side of the frame 1 and mounted above the same, as clearly shown in Fig. 11, is an endless conveyer belt 75. The conveyer belt 75, during the operation of the machine, is designed to convey the bundles of grain from the binder or other machine which is used in conjunction with the shocking machine, the bundles of grain being deposited upon the belt 75 adjacent the outer end thereof, the same being conveyed by said belt toward the center of the machine where said bundles are cared for in the manner hereinafter described. In order that the bundles of grain will be positively carried by said belt, the same is provided with outwardly projecting spikes or fingers, as shown, adapted to engage the bundles and positively carry the same with the belt when the latter is moved. Said belt is mounted upon rollers 76 which are rotatably mounted in suitable bearings 77 arising from and secured to the main frame 1. The shaft of the roller 76 positioned at the inner end of the belt is provided with a bevel pinion 76' which meshes with a pinion 76'' carried by a shaft 76''', the latter being operatively connected with the gear 26 by means of a pinion which engages a crown gear 26' formed upon one side of the gear 26, as clearly shown in Figs. 1, 2, 3 and 11. With this construction, during operation of the machine, the belt 75 will be continuously rotated, since a positive connection is established between said belt and the gear 26 which, during operation of the machine, is continuously rotated as above described.

Provided at the inner end of the belt 75 is a hopper 78 into which the bundles of grain are deposited by the belt 75, when the latter is in operation. The hopper 78 is adapted to direct the grain bundles into a vertically disposed cylindrical carrier 79 which is slidably mounted below said hopper, as clearly shown in Figs. 1 and 11, said carrier being adapted to carry the grain bundles to and deposit the same upon the platform before mentioned. The side of the carrier 79 adjacent the platform, is formed of two arcual sections 80 which are slidably mounted upon the body or opposite side of said carrier, the entire carrier being slidably mounted at its lower end upon a horizontally disposed plate 81 which is arranged substantially coplanar with or slightly above the platform, the inner or rearward end of said plate, when said plate is in normal position, being positioned adjacent the periphery of the platform, as shown in Fig. 11. The carrier is secured to the rearward or inner end of a rack bar 82 which is slidably mounted in a bearing bracket 83 projecting upwardly from the frame 1, so that reciprocatory movement of said rack bar effects corresponding movement of said carrier. The sections 80 of the carrier are movably connected with the body thereof through the medium of headed inwardly projecting pins or studs 84 which engage arcual slots 85 provided in said carrier body, as clearly shown in Fig. 11. Said sections 80, when moved to open the rear side of the carrier, telescope with the carrier body, remaining in close proximity with the outer side or surface thereof. This movement of the sections 80 is secured through the provision of segmental racks 86 which are provided upon the outer sides of said sections 80 intermediate the extremities thereof. The segmental racks 86 mesh with stationary racks 86' which are provided at opposite sides of the carrier, the arrangement being such that upon rearward or operative movement of the carrier, the racks 86, engaging with the racks 86', will rotate said sections 80 to telescoping position, as above mentioned, in which position of said sections, the rear side of the carrier will be open to permit of the discharge of the grain bundle therefrom.

Arranged upon the inner side of the carrier body adjacent the upper end thereof, is a plate 87 which is supported by curved leaf springs 87'. The central portions of said leaf springs 87' project through openings which are provided in the carrier body, as clearly shown in Figs. 2 and 11, so that upon movement of the carrier sections 80 to open position, the forward edges of said sections will engage the outwardly projecting portions of said springs and thereby flex the latter inwardly to cause a corresponding movement of the plate 87 which is carried thereby. The function of this construction is simply that of forcing the upper end of the bundle of grain toward the center of the platform when the bundle has been delivered to the latter by the carrier. By providing said plate 87 it will be seen that upon the bundle having been delivered to the platform and positioned thereon, as the carrier nears the inner terminal of its movement, said plate 87 will be moved into engagement with the upper end of the grain bundle to tilt the same toward the center of the platform into engagement with a support there provided as hereinafter described.

Reciprocation of the rack bar 82 and hence of the bundle carrier is effected through the medium of a gear 88 which meshes with said rack bar. The gear 88 is mounted upon a shaft 89 which carries a bevel gear 90. Said bevel gear 90 meshes with a bevel gear 91 carried by a shaft 92 upon which is also carried a pinion 93. The pinion 93 is positioned between two gears 94 and 95 which are fixed upon a shaft 96 suitably mounted in bearing provided upon the frame 1. Formed upon the adjacent sides of the gears 94 and 95 are divisions of gear teeth 97 and 98 respectively, as clearly shown in Figs. 25 and 27. Said gear teeth are adapted to mesh with the pinion 93, the divisions of teeth in one gear being arranged to alternate with those arranged upon the other so that upon the rotation of said gears, said pinion will be successively and alternately engaged by the teeth of said gears. This alternate engagement of the pinion 93 with the teeth 97 and 98 will effect the oscillation of said pinion, that is, said pinion will be first rotated in one direction and then in the other, such movement of said pinion, through the medium of the train of gears 88, 90 and 91, effecting the reciprocatory movement of the rack bar 82 and hence of the carrier connected therewith. By referring to Figs. 25 and 27, it will be observed that the divisions of teeth in the gears 94 and 95 do not all contain the same number of teeth, four of the divisions, in each gear, containing a greater number than the other divisions which all contain the same number of teeth. With this arrangement the carrier, when the pinion 93 is engaged with the divisions containing the greater number of teeth, will be moved inwardly or rearwardly a greater distance than the same is moved when engaged by the teeth of the other divisions. This arrangement is adopted in order that the first four bundles of grain which are carried to the platform will be positioned adjacent the center of the latter, and so that the remaining seven bundles which are conveyed thereto will be positioned outside of or around the first four bundles.

Rotation of the gears 94 and 95 is effected by a pinion 99 which meshes with gear teeth formed in the periphery of the gear 94, said pinion 99 being carried by a shaft 100 which is suitably mounted in bearings provided on the frame 1. The shaft 100 carries at one end a gear 101 which meshes with a gear 102 carried by a shaft 103, as clearly shown in Fig. 30, the shaft 103 being operatively connected through a connecting link or shaft 104 with the shaft 27, universal joints or knuckles being employed in this connection, as clearly shown in Figs. 1 and 2. The gear 102 is thus positively connected with the traction wheel of the machine and so that during operation or movement of the latter, said gear will be continuously rotated. As shown in Fig. 30, the gear 101 is mutilated so that intermittent rotation thereof by the gear 102 will be secured, it being clear that the gear 101 may be rotated by the gear 102 through but one revolution when the mutilated portion thereof will register with said gear 102, when the operative connection between said gears will be discontinued. The gear 102 is so proportioned relative to the pinion 93 and the teeth 97 and 98 that one revolution of the former will effect one complete reciprocation of the bundle carrier and so that in the operation of the machine, said carrier will be intermittently reciprocated, the operation of the same being dependent upon the operative connection of said gear 101 with the gear 102.

Loosely mounted upon the shaft 100 adjacent the gear 101 is a rocker arm 105 upon which is carried a gravity governed pawl 106 which is adapted to engage with a ratchet tooth 107 formed in the hub of said gear. The rocker arm 105 is operatively connected by the connecting member 108 with a crank 109 carried by a shaft 110. The arrangement is such that rotation of the shaft 110 will effect reciprocation of the member 108 and hence oscillation of the rocker arm 105 and the pawl 106 carried by said arm. The ratchet tooth 107 is so positioned relative to the mutilated portion of the gear 101 that engagement of the pawl 106 with said ratchet tooth will occur when said mutilated portion of said gear is in registration with the gear 102, and so that the partial rotation which will be imparted to the gear 101 by the pawl 106, upon rotation of the shaft 110, will be sufficient to effect the engagement of the teeth of said gear 101 with those of the gear 102; in other words, the pawl 106 will serve to span the mutilation in establishing the operative connection between said gears. The shaft 110 carries at its outer end a bevel gear 111 which is adapted to mesh with the bevel gear 112 of the binder or other machine in conjunction with which this device is employed.

In binders of the construction with which it is contemplated to use this machine, the rotation of the gear 112 is controlled by the bundles of grain which are discharged from the binder or machine carrying this gear, the latter being turned through one complete rotation upon each expulsion of a grain bundle from the binder or other machine. This being so, it will be seen that the rotation of the shaft 110 will be controlled by the grain bundles which are deposited upon the conveyer belt 75 and so that in the operation of the machine, the mechanism which is operatively connected with the shaft 110 and hence the shaft 100, will only be operated when grain bundles are delivered to the machine. The mechanism which is operatively connected with the shaft 100 comprises the carrier which is operatively connected with said shaft 100 through the medium of the pinion 99 and the train of gears connected with said pinion, and the platform sections which are operatively connected with said shaft through the medium of the pinion 116 which meshes with a crown gear 117 provided upon one side of the gear 32, so that the operation of these parts of the mechanism will be controlled by the shaft 110 and therefore will operate only when bundles of grain are delivered to the machine to be cared for by said parts of the mechanism.

The connecting member 108 which operatively connects the shaft 110 with the pawl 106, is formed of two telescoping sections, these sections being held in normal position by means of a helical tension spring 113 which is interposed between a collar 114 which is secured to the bar section of said connecting member and a collar 115 which is secured within the tubular section of said connecting member, the collar 114 abutting normally a stop plug 115′ which closes one end of the tubular section, as clearly shown in Fig. 30. With this construction it will be seen that the connecting member 108 is rendered yieldable, so that upon the commencement of rotation of the shaft 110 a sudden jarring and commencement of operation of the mechanism engaged by the pawl 106 will be obviated.

Arranged centrally above the platform is a supporting member 118, said supporting member being four-sided, the same being provided with four recesses or pockets adapted for the reception of bundles of grain which are delivered to the platform by the carrier, the upper ends of the bundles, upon being deposited upon the platform, being tilted inwardly by the plate 87, as above described, so that the upper ends of the bundles will lean against the supporting member 118 in substantially pyramidal formation, the recesses in the sides of the member 118 serving to prevent the bundles falling to one side, said recesses maintaining the bundles in upright position. The member 118 is suspended in position above the platform by means of the stem 119 which is rotatably and slidably mounted in a supporting bracket 120. In the operation of the machine, it is apparent that the member 118 will be required to move simultaneously with the platform, the amplitudes of movement and the periods of rest and rotation being required to be identical with those of said platform. To this end a bevel gear 121 is provided meshing with a bevel gear 122 which is arranged upon the stem 119, said stem being locked against rotation to said gear but slidable therein, as clearly shown in Fig. 14. The gear 121 is carried at one end of a shaft 123, the mentioned end of said shaft being mounted in the bearing bracket 120, the opposite end of said shaft being mounted in a bearing 124 arising from the frame 1 and being provided with a pinion 125 which meshes with gear teeth 126 provided upon one side of the gear 94, as shown in Fig. 26. The gear teeth 126 are arranged upon the gear 94 to correspond with the arrangement of the teeth 73 and 74 upon the gear 32 so that in the operation of the machine the supporting member 118 will be intermittently rotated at exactly the same intervals and the same distances as the platform, as above mentioned, the rotation of the platform being, as above described, controlled by the gear teeth 73 and 74 which mesh with the gears 71 and 72.

During the operation of the machine, after eleven bundles of grain have been deposited upon the platform, as above described, the platform sections are released and moved outwardly so as to effect the discharge of the bundles or the shock which is formed by the bundles upon the platform, onto the ground. This discharging of the shock takes place while the machine is in motion, so that in order that the shock will remain intact and left upon the ground in substantially the same condition as formed upon the platform, the supporting post must be elevated out of engagement with the shock so as to prevent said post upsetting the shock when the machine continues to move after dropping the shock. To this end, the upper end of the stem 119 of the supporting member is swiveled to the lower end of a vertically movable rack bar 127, as shown in Fig. 14. The rack bar 127 meshes with a gear 128 mounted in the supporting bracket 120 so that vertical movement of said supporting member may be effected by rotating said gear. The latter is connected through the medium of a universal or knuckle joint with one end of a shaft or connecting rod 129, the opposite end of the latter being mounted in the bearing 124 and being provided with a pinion 130 adapted to mesh with a series of gear teeth 131 formed upon one side of the gear 95, as clearly shown in Figs. 11 and 28. The gear teeth 131 are so positioned upon said gear 95 that engagement of said teeth with the pinion 130, in order to effect elevation of the supporting member 118, will occur at the moment when the platform sections are released and moved outwardly to effect the discharge of the shock therefrom; this release of said platform sections being secured by a finger or lug 132 which projects from the periphery of said gear 95 for contact engagement with the finger 41 of the member 39, the engagement of the finger 132 with the projecting portion 41 of the member 39 effecting the tilting of the latter and hence the pulling of the cord 36 which is connected with the various detents 34, as before described. The supporting member 118 will be held in elevated position for only a short period of time, the same dropping by gravity to normal position upon the disengagement of the pinion 130 from the gear teeth 131.

In the operation of the machine the platform sections, after release of the latter to discharge the shock therefrom, will not be returned to normal position in time to receive the deposit of the first bundle of the next shock to be formed thereon. Mechanism is therefore provided to move the plate 81 to a position over the platform during the movement of the bundle carrier in conveying the first bundle of each shock to the platform, this movement of said plate to a position over the platform simultaneously with the delivering movement of the carrier delaying, as will be understood, the contacting of the bundle with the platform to such an extent as to afford ample time for the platform sections to close together before the bundle is deposited thereon. To permit of this movement of the plate 81, the latter is mounted in channel guides 133 which are secured to supporting plates 134 fixed to the parallel extending ends of an annular member 135 which is provided above the platform, said member 135 being of a diameter corresponding substantially with that of said platform, as clearly shown in Fig. 1. Arising from the outer end of the plate 81 is a supporting frame 136 in the upper end of which is mounted for vertical sliding a plate 137. The latter is pivotally connected at 138 with a bell crank lever 139 which is fulcrumed at 140 to an arm which projects from the frame 136, as clearly shown in Fig. 31. The construction is such that downward tilting of the upper or outer end of said bell crank lever 139 effects vertical movement of the plate 137 so as to position the upper end thereof in the path of movement of a stop or projection 141 secured upon the under side of the rack bar 82 which carries the bundle carrier. The bar 82 is adapted, when the projection 141 thereof engages the plate 137, to carry the plate 81 along therewith in its movement toward the platform, the plate 137 remaining in engagement with the stop 141 through friction. In the operation of the machine, the tilting of the lever 139 in order to move the plate 137 vertically, as mentioned, is secured by a projecting stud or roller 142 which is carried upon one side of the gear 94, said projecting member 142 being so positioned upon said gear that said lever will be tilted so as to effect the carriage of the plate 81 beyond its normal position by the rack bar 82, at the time the first bundle of grain is carried by the bundle carrier toward the platform. The plate 137 is automatically lowered so as to release the projection 141 by a lever 143 which is fulcrumed at 144 in the frame 136, one end of said lever being in slot-and-pin connection, as shown, with the lower end of the bell crank lever 139. The opposite end of the lever 143 moves in an elongated guide slot 145 provided in the adjacent guide 133 and is adapted, when the plate 81 is moved inwardly the desired distance, to engage the inclined upper surface of a cam block 146, said end of said lever being adapted to ride up upon said inclined surface so as to rock the lever and hence the lever 139 so as to lower said plate 137. Upon being released the plate 81 is returned to normal position by a tension spring 147 which is secured at one end to the base of the supporting frame 136 and at its other end to a cross bar 148 which is secured to the extended outer ends of the guides 133.

In order to afford clearance for the shock when discharged from the platform onto the ground and upon continued movement of the machine, the rearward end of the frame 1 as well as of the annular member 135 and the members 8 corresponding with the platform sections 7″ and 7‴ are bent or offset upwardly, as clearly shown in Fig. 14 and the several views. However, in the outward movement of the platform sections to effect the discharge of the shock therefrom, it is necessary to provide a stop of some sort against which the bundles of grain will contact so as to be stripped from the platform sections as the same are moved outwardly, it being clear that without such provision the bundles of grain would remain upon the platform sections and move correspondingly therewith. As regards the forward platform sections the forward end portion of the annular member 135 will coöperate therewith to perform this function there being arcual plates 135′ secured upon said portion of said member 135 which depend therefrom into close proximity with the platform, as shown in Fig. 14. At the rearward end of the machine it is clear that movable stripping means corresponding with the plates 135′ must be provided which will remain in operative position to perform the stripping function but which will be moved to a position to afford clearance for the shock when the same is discharged upon the ground. To this end, arcual plates 149 are provided, the outer ends of said plates being pivotally secured at 150 to the member 135 at the points of offset thereof, as shown in Fig. 14. The members 149, when in normal position, form a substantially semi-circle, as shown in Fig. 7, the same being positioned relatively to the rearward end portion of the platform as the plates 135′ are positioned to the forward end portion of said platform, and so that when in normal position said members 149 will be adapted to strip the grain bundles from the rearward platform sections in the same manner as the grain bundles are stripped from the forward platform sections by said plates 135′.

The members 149 are normally held in inoperative position by means of helical tension springs 151, the respective extremities of which are secured to lugs 152 secured to and projecting from the members 149 adjacent their pivotal points and stationary arms 153 which project from the member 135. Said members 149 are held in operative position by means of a spring pressed latch 154 which is pivotally mounted upon one of said members, said latch being adapted to engage the contiguous outwardly projecting ends 155 of said members 149, as clearly shown in Figs. 7 and 14, to hold the same in operative position. Rocking of said latch to release the members 149 is secured by means of a cord 156 which is connected at one end with the upper end of said latch, the opposite end of said cord being connected with the outer end of a pivoted arm 157, said cord passing over a guide roller 158 in its passage between these points. The outer end of the arm 157 is, however, positioned in the path of movement of a spring held tripping arm 159 which is carried by one of the members 8 at the rearward end of the machine, as shown in Fig. 7. The arrangement is such that, in the operation of the machine, when the members 8 and hence the platform sections which are carried thereby have reached a position close to their outer terminals of movement, the arm 159 will contact and tilt the arm 157 and thus cause the tilting of the latch 154 to release the stripping members 149 which are immediately rocked outwardly by the springs 151. The arm 159 coöperates with a stop 160 which prevents movement of said arm in one direction, swinging movement of said arm against the tension of the spring which coöperates therewith being permitted so as to pass the arm 157 when returning to normal position. The stripping members 149 are returned to normal position by the rearmost arms 8 when the latter are moved inwardly to normal position, spring held rollers 161 carried by said members 8 being adapted to engage against the outer sides of the members 149 so as to force the same against the tension of the springs 151 to normal position, in which position the same will be held until released by the latch 154.

In the operation of the machine, then, the bundles of grain which are delivered to the conveyer belt 75 by the binder or other machine in conjunction with which this machine is employed, will be carried by said belt to the hopper 78. Said hopper will guide the bundles into the cylindrical carrier which in turn will be reciprocated to effect the delivery thereof upon the platform in a position in which the upper ends of the bundles lean against the central supporting member supported above the platform. The reciprocating operation of the carrier will be governed, as before mentioned, by the rotation of the shaft 110 which in turn is governed by the delivery of grain bundles to the conveyer 75 by the machine in conjunction with which this device is used, so that the bundle-handling mechanism will be inoperative except when bundles are provided for handling by said mechanism. The platform alternating in operative intervals with the bundle carrier will be intermittently rotated so that the bundles, as the same are delivered to said platform, will be arranged thereon symmetrically and in circular formation. The platform will be so operated that the first four bundles of each shock which is formed thereon, will be positioned against the four sides of the supporting member or in position in the four pockets which are provided in said supporting member. The platform will then be intermittently rotated in such a manner that the remaining seven bundles of each shock will be arranged upon the platform symmetrically distributed around the first four, the amplitude of reciprocation of the bundle carrier, in the delivery of the latter seven bundles, being less than when delivering the first four for a reason which is obvious. Upon eleven bundles of grain being delivered to the platform and arranged thereon to form a shock, as mentioned, the platform sections will be automatically moved outwardly so as to discharge the shock thus formed upon the ground, said platform sections, after the discharge of the shock therefrom, being returned to normal position, thus completing a cycle of operation, the succeeding cycles of operation being repetitions of that set forth.

A shocking machine of the construction set forth will be found to be durable and economical in construction, the same will be found to be of high efficiency in operation and a saver of time and labor, since with this machine the manual shocking of the bundles of grain is dispensed with.

While I have illustrated and described the preferred form of construction for carrying my invention into effect, this is capable of variation and modification without departing from the spirit of the invention. I therefore, do not wish to be limited to the exact details of construction set forth, but desire to avail myself of such variations and modifications as come within the scope of the appended claims.

Having described my invention, what I claim as new and desire to secure by Letters Patent, is:

1. A shocking machine comprising a wheeled frame; a sectional platform rotatably mounted in said frame, the sections of said platform being radially movable toward and from each other; means, adapted upon release of said platform sections, to automatically operate to move the same outwardly; an operative connection between one of the wheels of said frame and said platform sections for moving the same inwardly; detents for releasably holding said platform sections at their inner terminals of movement; means, adapted upon the deposit of a predetermined number of bundles upon said platform, to actuate said detents to release said platform sections; and means for conveying bundles to said platform, substantially as described.

2. A shocking machine comprising a wheeled frame; a sectional platform rotatably mounted in said frame, the sections of said platform being radially movable toward and from each other; resilient means, adapted upon the release of said platform sections, to automatically operate to move the same outwardly; an operative connection between one of the wheels of said frame and said platform sections for moving the same inwardly; detents for releasably holding said platform sections at their inner terminals of movement; means, adapted upon the deposit of a predetermined number of bundles upon said platform, to actuate said detents to release said platform sections; and means for conveying bundles to said platform, substantially as described.

3. A shocking machine comprising a wheeled frame; a sectional platform rotatably mounted in said frame, the sections of said platform being radially movable toward and from each other; levers and resilient means coöperating therewith adapted upon the release of said platform sections to automatically operate to move the same outwardly; an operative connection between one of the wheels of said frame and said platform sections for moving the same inwardly; detents for releasably holding said platform sections at their inner terminals of movement; means, adapted upon the deposit of a predetermined number of bundles upon said platform, to actuate said detents to release said platform sections; and means for conveying bundles to said platform, substantially as described.

4. A shocking machine comprising a wheeled frame; a sectional platform rotatably mounted in said frame, the sections of said platform being radially movable toward and from each other; levers and springs coöperating therewith adapted upon release of said platform sections to automatically operate to move the same outwardly; an operative connection between one of the wheels of said frame and said platform sections for moving the same inwardly; detents for releasably holding said platform sections at their inner terminals of movement; means, adapted upon the deposit of a predetermined number of bundles upon said platform, to actuate said detents to release said platform sections; and means for conveying bundles to said platform, substantially as described.

5. A shocking machine comprising a wheeled frame; a sectional platform rotatably mounted in said frame, the sections of said platform being movable toward and from each other; means, adapted upon the release of said platform sections, to automatically operate to move the same outwardly; an operative connection between one of the wheels of said frame and said platform sections for moving the same inwardly; detents for releasably holding said platform sections at their inner terminals of movement; gearing, adapted upon the deposit of a predetermined number of bundles upon said platform, to effect the actuation of said detents to release said platform sections; and means for conveying bundles to said platform, substantially as described.

6. A shocking machine comprising a wheeled frame; a sectional platform rotatably mounted in said frame, the sections of said platform being radially movable toward and from each other; means adapted upon the release of said platform sections to automatically operate to move the same outwardly; an operative connection between one of the wheels of said frame and said platform sections for moving the same inwardly; pivoted detents for releasably holding said platform sections at their inner terminals of movement; means for moving said detents to release said platform sections; means for actuating said releasing means to move said detents to releasing position upon the deposit of a predetermined number of bundles upon said platform; and means for conveying bundles to said platform, substantially as described.

7. A shocking machine comprising a wheeled frame; a sectional platform rotatably mounted in said frame, the sections of said platform being movable toward and from each other; reciprocatory conveying means for conveying bundles to said platform; means for reciprocating said conveying means so that the amplitude of reciprocation will be varied periodically; and means for moving said platform sections outwardly upon the deposit of a predetermined number of bundles upon said platform, substantially as described.

8. A shocking machine comprising a wheeled frame; a sectional platform rotatably mounted in said frame, the sections of said platform being movable toward and from each other; reciprocatory conveying means for conveying bundles to said platform; means for reciprocating said conveying means so that the amplitude of reciprocation will be varied periodically; endless conveying means for conveying bundles to said reciprocatory conveying means; and means for moving said platform sections outwardly upon the deposit of a predetermined number of bundles upon said platform, substantially as described.

9. A shocking machine comprising a wheeled frame; a sectional platform rotatably mounted in said frame, the sections of said platform being movable toward and from each other; means for intermittently rotating said platform; reciprocatory conveying means for conveying bundles to said platform; means for reciprocating said conveying means so that the amplitude of reciprocation will be varied periodically; and means for moving said platform sections outwardly upon the deposit of a predetermined number of bundles upon said platform, substantially as described.

10. A shocking machine comprising a supporting frame; a sectional platform mounted in said frame, the sections of said platform being movable toward and from each other; means for conveying bundles to said platform; and forward and rearward means in said frame adapted upon the outward movement of said sections to strip the bundles therefrom, the stripping means at the rearward side of said frame being movable to afford clearance for the bundles when dropped from the platform to the ground and when the device is moved forwardly, substantially as described.

11. A shocking machine comprising a supporting frame; a sectional platform mounted in said frame, the sections of said platform being movable toward and from each other; means for conveying bundles to said platform; forward and rearward means in said frame adapted upon the outward movement of said sections to strip the bundles therefrom, the stripping means at the rearward side of said frame being movable to afford clearance for the bundles when dropped from the platform to the ground and when the device is moved forwardly; and an operative connection with said rearward stripping means, whereby said means will be moved to afford clearance for the bundles when said platform sections are near their outward terminals of movement, substantially as described.

12. A shocking machine comprising a supporting frame; a sectional platform mounted in said frame, the sections of said platform being movable toward and from each other; means for conveying bundles to said platform; forward and rearward means in said frame adapted upon the outward movement of said sections to strip the bundles therefrom, the stripping means at the rearward side of said frame being movable to afford clearance for the bundles when dropped from the platform to the ground and when the device is moved forwardly; an operative connection with said rearward stripping means, whereby said means will be moved to afford clearance for the bundles when said platform sections are near their outward terminals of movement; and means for returning said stripping means to normal position upon the inward movement of said platform sections, substantially as described.

13. A shocking machine comprising a supporting frame; a sectional platform mounted in said frame, the sections of said platform being movable toward and from each other; means for conveying bundles to said platform; forward and rearward means in said frame adapted upon the outward movement of said sections to strip the bundles therefrom, the stripping means at the rearward side of said frame being automatically movable to afford clearance for the bundles when dropped from said platform to the ground and when the device is moved forward; means for releasably holding said rearward stripping means in stripping position; means for tripping said holding means to release said stripping means when said platform sections are near their outer terminals of movement; and means for moving said stripping means to stripping position upon the return of said platform sections to their inward positions, substantially as described.

14. A shocking machine comprising a wheeled frame; a sectional platform rotatably mounted in said frame, the sections of said platform being movable toward and from each other; means for intermittently rotating said platform; reciprocatory conveying means for conveying bundles to said platform; means for reciprocating said conveying means so that the amplitude of reciprocation will be varied periodically; and means for moving said platform sections to effect the dropping of the bundles therefrom to the ground after the deposit of a predetermined number of bundles upon said platform, substantially as described.

15. A shocking machine comprising a revoluble platform; reciprocatory conveying means for conveying bundles to said platform; means for reciprocating said conveying means so that the amplitude of reciprocation will be varied periodically; and means for effecting the discharge of bundles from said platform after a predetermined number of bundles have been deposited thereon, substantially as described.

16. A shocking machine comprising a revoluble platform; means for conveying bundles to said platform; means for operating said conveying means so that the position of deposit of said bundles upon said platform will be varied periodically; and means for effecting the discharge of bundles from said platform after a predetermined number of bundles have been deposited thereon, substantially as described.

17. A shocking machine comprising a revoluble platform; means for conveying bundles to said platform; means for operating said conveying means so that the position of deposit of said bundles upon said platform relative to the center of said platform will be varied periodically; and means for effecting the discharge of bundles from said platform after a predetermined number of bundles have been deposited thereon, substantially as described.

18. A shocking machine comprising a supporting frame; a sectional platform mounted in said frame; the sections of said platform being movable toward and from each other; means for conveying bundles to said platform; forward and rearward means in said frame adapted upon the outward movement of said sections to strip the bundles therefrom; stripping means at the rearward side of said frame comprising two oscillatory members adapted to automatically swing outwardly to afford clearance for the bundles when dropped from said platform to the ground and when the device is moved forwardly; means for releasably holding said rearward stripping means for stripping position; means for tripping such holding means to release said stripping means when said platform sections are near their outer terminals of movement; and means for moving said stripping means to stripping position upon the return of said platform sections to their inward positions, substantially as described.

19. A shocking machine comprising a rotatable sectional platform; means for conveying bundles to said platform and depositing the same thereon, the sections of said platform being radially movable toward and from each other; supports for movably supporting said sections; rack bars connected with said sections; gears meshing with said rack bars adapted when rotated to move said rack bars to impart inward movement to said platform sections, said gears being adapted to release said rack bars when said platform sections are at their inward positions; detents for holding said sections at their inward positions; means for actuating said detents to release said sections after a predetermined number of bundles have been deposited upon said platform; and means for outwardly moving said platform sections to discharge the bundles therefrom when said sections are released by said detents, substantially as described.

20. A shocking machine comprising a wheeled frame; a sectional platform rotatably mounted in said frame; means for conveying bundles to said platform and depositing the same thereon, the sections of said platform being radially movable toward and from each other; supports for movably supporting said sections; rack bars connected with said sections; gears meshing with said rack bars adapted when rotated to move said rack bars to impart inward movement to said platform sections, said gears being adapted to release said rack bars when said platform sections are at their inward positions; detents for holding said sections at their inward positions; means for actuating said detents to release said sections after a predetermined number of bundles have been deposited upon said platform; means for outwardly moving said platform sections to discharge the bundles therefrom when said sections are released by said detents; and an operative connection between one of the wheels of said frame and said gears, substantially as described.

21. A shocking machine comprising a rotatable sectional platform; means for conveying bundles to said platform and depositing the same thereon, the sections of said platform being radially movable toward and from each other; supports for movably supporting said sections; rack bars connected with said sections; mutilated gears meshing with said rack bars adapted when rotated to move said rack bars to impart inward movement to said platform sections, the mutilations in said gears registering with said rack bars to release the latter when said platform sections are at their inward positions; detents for holding said sections at their inward positions; means for actuating said detents to release said sections after a predetermined number of bundles have been deposited upon said platform; and means for outwardly moving said platform sections to discharge the bundles therefrom when said sections are released by said detents, substantially as described.

22. In a shocking machine, a revoluble platform; an upright supporting member arranged centrally above said platform; reciprocatory conveying means for conveying bundles and depositing the same upon said platform adjacent said supporting member; means for reciprocating said conveying means; and means on said conveying means for tilting the upper ends of the bundles deposited upon said platform toward said supporting member, substantially as described.

23. In a shocking machine, a revoluble platform; an upright supporting member arranged centrally above said platform; reciprocatory conveying means for conveying bundles and depositing the same upon said platform adjacent said supporting member; means for reciprocating said conveying means; and means on said conveying means adapted to engage the upper ends of the bundles deposited upon said platform and tilt the same toward said supporting member after the same have been deposited upon said platform, substantially as described.

24. In a shocking machine, a revoluble platform; reciprocatory conveying means for conveying bundles to said platform; said conveying means consisting of an upright reciprocatory tubular member; and movable portions at the side of said tubular member adjacent said platform adapted to be moved to permit of the discharge of a bundle from said tubular member as the same approaches said platform, substantially as described.

In testimony whereof I have signed my name to this specification in the presence of two subscribing witnesses.

CARL ORGAARD.

Witnesses:
JOSHUA R. H. POTTS,
HELEN F. LILLIS.

---

Copies of this patent may be obtained for five cents each, by addressing the "Commissioner of Patents, Washington, D. C."